US008249270B2

(12) United States Patent
Matsuo

(10) Patent No.: US 8,249,270 B2

(45) Date of Patent: Aug. 21, 2012

(54) SOUND SIGNAL CORRECTING METHOD, SOUND SIGNAL CORRECTING APPARATUS AND COMPUTER PROGRAM

(75) Inventor: Naoshi Matsuo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1309 days.

(21) Appl. No.: 11/698,113

(22) Filed: Jan. 26, 2007

(65) Prior Publication Data

US 2008/0085012 A1 Apr. 10, 2008

(30) Foreign Application Priority Data

Sep. 25, 2006 (JP) ................................ 2006-258965

(51) Int. Cl.
*H04B 15/00* (2006.01)

(52) U.S. Cl. ...... 381/94.1; 381/94.3; 704/200; 704/226; 704/233; 708/322

(58) Field of Classification Search ................. 381/94.3, 381/94.1; 704/200, 226, 233; 708/322
See application file for complete search history.

(56) References Cited

U.S. PATENT DOCUMENTS

| | | | | |
|---|---|---|---|---|
| 4,630,305 A | | 12/1986 | Borth et al. | 381/94 |
| 5,974,373 A | * | 10/1999 | Chan et al. | 704/200 |
| 6,351,731 B1 | | 2/2002 | Anderson et al. | 704/233 |
| 2005/0240401 A1 | | 10/2005 | Ebenezer | 704/226 |
| 2007/0232257 A1 | | 10/2007 | Otani et al. | 455/403 |

FOREIGN PATENT DOCUMENTS

| | | |
|---|---|---|
| EP | 1 376 539 A1 | 1/2004 |
| JP | 7-193548 | 7/1995 |
| JP | 9-34497 | 2/1997 |
| JP | 2000-47697 | 2/2000 |
| JP | 2001-134287 | 5/2001 |
| JP | 2004-20945 | 1/2004 |
| JP | 2004-61567 | 2/2004 |
| JP | 2006-47639 | 2/2006 |
| WO | WO 2006/046293 A1 | 5/2006 |

OTHER PUBLICATIONS

Office Action dated Nov. 30, 2010 corresponding to Japanese patent application No. 2006-258965 with English translation, and Certification.

Korean Office Action dated Mar. 27, 2008.

Statistics, IEEE Trans. on speech and audio processing. vol. 9, No. 5, pp. 504-512, Rainer Martin, published on Jul. 31, 2001. Noise power spectral density estimation based on optimal smoothing and minimum statistics.

ICSLP 96, vol. 2, pp. 905-908, Hiroshi Matsumoto, et al., published on Oct. 31, 1996. Smoothed spectral subtraction for a frequency-weighted HMM in noisy speech recognition.

Extended European Search Report dated Jul. 30, 2007.

* cited by examiner

*Primary Examiner* — Vivian Chin
*Assistant Examiner* — Paul Kim
(74) *Attorney, Agent, or Firm* — Kratz, Quintos & Hanson, LLP

(57) ABSTRACT

A sound signal correcting apparatus converts an acquired sound signal into a phase spectrum and an amplitude spectrum by an FFT process, compares the amplitude spectrum of the obtained sound signal with a noise model so that a correction coefficient used for correcting the amplitude spectrum of the sound signal is derived, smoothes waveform of the amplitude spectrum of the sound signal using the derived correction coefficient, and converts the sound signal into a sound signal where the amplitude spectrum is corrected by performing an inverse FFT process on the phase spectrum and the smoothed amplitude spectrum.

11 Claims, 9 Drawing Sheets

SOUND SIGNAL CORRECTING METHOD, SOUND SIGNAL CORRECTING APPARATUS AND COMPUTER PROGRAM

CROSS-REFERENCE TO RELATED APPLICATIONS

This Nonprovisional application claims priority under 35 U.S.C. §119(a) on Patent Application No. 2006-258965 filed in Japan on Sep. 25, 2006, the entire contents of which are hereby incorporated by reference.

BACKGROUND OF THE INVENTION

1. Field of the Invention

The present invention relates to a sound signal correcting method for correcting a sound signal based on acquired sound, on the basis of a noise model relating to a noise pattern, a sound signal correcting apparatus to which this sound signal correcting method is applied, and a computer program for implementing this sound signal correcting apparatus. In particular, the present invention relates to a sound signal correcting method in which the recognition ratio of voice for the acquired sound is increased, a sound signal correcting apparatus and a computer program.

2. Description of Related Art

Noise suppressing technology for suppressing a noise component in sound acquired under an environment with noise is used for the purpose of increasing the recognition ratio of voice in speech recognizing apparatuses, such as car navigation devices, and increasing the quality of apparatuses relating to voice, for example increasing the quality of sending voice in phones.

FIG. 1 is a diagram conceptually showing conventional noise suppressing technology. According to conventional noise suppressing technology, sound including noise and voice is acquired, and a sound signal based on the acquired sound on a frame-by-frame basis, which is an input signal in(n), is converted into a phase spectrum $\tan^{-1}$ IN(f) and an amplitude spectrum |IN(f)| by an FFT (Fast Fourier Transformation) process. Then, an amplitude spectrum |N(f)| of stationary noise is estimated on the basis of a noise model having a high degree of similarity with the amplitude spectrum |IN(f)| of the sound signal, and the estimated amplitude spectrum |N(f)| of stationary noise is subtracted from the amplitude spectrum |IN(f)| of the sound signal. Then, the amplitude spectrum |IN(f)| from which the amplitude spectrum |N(f)| of stationary noise has been subtracted and the phase spectrum $\tan^{-1}$ IN(f) are converted by an inverse FFT process, and thereby, an output signal out(n) in each frame is derived. The derived output signal is used for processing, for example speech recognition, as a sound signal where noise is suppressed.

FIGS. 2A and 2B are diagrams showing an amplitude spectrum relating to conventional noise suppressing technology. FIG. 2A shows the relationship between the values of frequency and amplitude in the amplitude spectrum |IN(f)| of a sound signal, and FIG. 2B shows the relationship between the values of frequency and amplitude in the amplitude spectrum |IN(f)| from which the amplitude spectrum |N(f)| of stationary noise has been subtracted. As is clear when FIGS. 2A and 2B are compared, the estimated amplitude spectrum |N(f)| of stationary noise has been subtracted from the amplitude spectrum |IN(f)| of an input signal in the waveform shown in FIG. 2B, and thereby, noise is suppressed. Such noise suppressing technology is referred to as spectral subtraction, and noise suppressing technology using spectral subtraction is disclosed in, for example, Japanese Patent Application Laid-Open No. 07-193548 (1995).

BRIEF SUMMARY OF THE INVENTION

However, noise includes non-stationary components which change over time, and therefore, non-stationary components remain in noise suppressing technology using spectral subtraction as that described in Japanese Patent Application Laid-Open No. 07-193548 (1995). The waveforms shown in FIGS. 2A and 2B, for example, relate to an input signal made up of only noise, where highly non-stationary noise, as shown in FIG. 2B, remains when stationary noise is suppressed. Noise which remains in this manner is unnatural noise, and therefore, the level of matching with noise models included in a sound model for speech recognition is low, causing a problem, such that precision in noise recognition is low. Concretely, error is caused, so that remaining noise is recognized as a phoneme of which the spectral power is relatively small, such as "s" and "n." Accordingly, suppression of noise does not relate to increase in the recognition ratio of voice; rather, a problem arises, such that reduction in the recognition ratio of voice is caused. In addition, a problem arises, such that unnatural noise, such as musical noise, is generated.

The present invention has been made with the aim of solving the above problems, and it is an object of the invention to provide a sound signal correcting method capable of preventing unnatural noise from remaining, so that precision in noise recognition increases, increasing the recognition ratio of voice, and preventing musical noise from being generated, by comparing a sound signal with a noise model and smoothing waveform of the sound signal on the basis of the comparison result, a sound signal correcting apparatus to which this sound signal correcting method is applied, and a computer program for implementing this sound signal correcting apparatus.

A sound signal correcting method according to a first aspect is a sound signal correcting method for correcting a sound signal based on acquired sound, on the basis of a noise model relating to a noise pattern, comprising the steps of: comparing the sound signal with the noise model; and smoothing waveform of the sound signal on the basis of the comparison result.

A sound signal correcting apparatus according to a second aspect is a sound signal correcting apparatus for correcting a sound signal based on acquired sound, on the basis of a noise model relating to a noise pattern, comprising: means for comparing the sound signal with the noise model; and means for smoothing waveform of the sound signal on the basis of the comparison result.

A sound signal correcting apparatus according to a third aspect is a sound signal correcting apparatus for correcting a spectrum of a sound signal based on acquired sound, on the basis of a noise model relating to a spectrum of a noise pattern, comprising deriving means for deriving a correction coefficient used to correct the sound signal by comparing the spectrum of the sound signal with the noise model; and smoothing means for smoothing waveform of the sound signal using the derived correction coefficient.

A sound signal correcting apparatus according to a fourth aspect is the sound signal correcting apparatus according to the third aspect, characterized in that said deriving means derives the correction coefficient in accordance with a difference between intensity of the spectrum of the sound signal and a threshold value determined on the basis of the noise model.

A sound signal correcting apparatus according to a fifth aspect is the sound signal correcting apparatus according to the third or fourth aspect, characterized in that said smoothing means smoothes a change in the spectrum of the sound signal in the frequency axis direction.

A sound signal correcting apparatus according to a sixth aspect is the sound signal correcting apparatus according to the fifth aspect, characterized in that said smoothing means smoothes on the basis of the following formula (A):

$$|IN(f)'|=\alpha|IN(f-1)'|+(1-\alpha)|IN(f)| \quad \text{formula } (A)$$

where |IN(f)'| is a spectrum at frequency f after smoothing,

|IN(f)| is a spectrum at frequency f before smoothing,

|IN(f−1)'| is a spectrum at frequency f−1 which is different from the frequency f at a predetermined frequency interval, after smoothing, and $\alpha$ is a correction coefficient where $0 \leqq \alpha \leqq 1$.

A sound signal correcting apparatus according to a seventh aspect is the sound signal correcting apparatus according to the third or fourth aspect, characterized in that said smoothing means smoothes a change in the spectrum of the sound signal in the time axis direction.

A sound signal correcting apparatus according to an eighth aspect is the sound signal correcting apparatus according to the seventh aspect, characterized in that said smoothing means smoothes on the basis of the following formula (B):

$$|IN(f)'|t=\alpha|IN(f)'|t-1+(1-\alpha)|IN(f)|t \quad \text{formula (B)}$$

where |IN(f)'|t is a spectrum at frequency f at time t after smoothing,

|IN(f)|t is a spectrum at frequency f at time t before smoothing,

|IN(f)'|t−1 is a spectrum at frequency f at time t−1 which is before time t by a predetermined time, after smoothing, and $\alpha$ is a correction coefficient where $0 \leqq \alpha \leqq 1$.

A sound signal correcting apparatus according to a ninth aspect is the sound signal correcting apparatus according to any of the second to eighth aspect, characterized by further comprising means for executing a speech recognition process on the basis of the sound signal after smoothing.

A computer program according to a tenth aspect is a computer program for causing a computer to execute a process for correcting a sound signal based on acquired sound, on the basis of a noise model relating to a noise pattern, said computer program comprising: a step of causing the computer to compare the sound signal with the noise model; and a step of causing the computer to smooth waveform of the sound signal on the basis of the comparison result.

According to the present invention, a sound signal is compared with a noise model and waveform of the sound signal is smoothed on the basis of the comparison result, and thereby, highly non-stationary noise can be prevented from emerging, and the waveform of the sound signal can be corrected to waveform with stationary noise of which the level of matching with the noise model is high, and therefore, it is possible to increase precision in noise recognition, and accordingly, it is possible to increase the recognition ratio of voice when the invention is applied to, for example, a speech recognition apparatus. In addition, in the case where the invention is used in an apparatus relating to telephone communications, it is possible to prevent unnatural noise, such as musical noise, from being generated.

In addition, according to the present invention, the correction coefficient is changed in accordance with the result of comparison with a noise model, and therefore, the degree of smoothing becomes low in the case where a spectrum of which intensity is different from that of noise of voice or the like is included, and therefore, it is possible to increase the recognition ratio of voice, by preventing peaks in the voice from being smoothened.

In a sound signal correcting method, a sound signal correcting apparatus and a computer program according to the present invention, the sound signal based on acquired sound is compared with a noise model relating to a noise pattern, and a change in the waveform of the sound signal in the frequency axis direction and/or a change in the time axis direction is smoothed on the basis of the comparison result.

According to the present invention, highly non-stationary noise can be prevented from emerging, so that the waveform can be corrected to that of stationary noise having a high level of matching with the noise model, and therefore, excellent effects are gained, such that it is possible to increase precision in noise recognition. Accordingly, the present invention provides excellent effects, such that in the case where applied to, for example, a speech recognition apparatus, it is possible to increase the recognition ratio of voice, and in the case where used in an apparatus relating to telephone communications, it is possible to prevent unnatural noise, such as musical noise, from being generated.

In addition, a sound signal correcting apparatus or the like of the present invention compares a sound signal with a noise model, derives a correction coefficient used for correction of a sound signal in accordance with a difference between intensity of the spectrum of the sound signal and a threshold value determined on the basis of the noise model, and smoothes the waveform of the sound signal using the derived correction coefficient.

According to the present invention, the degree of smoothing can be low in the case where a spectrum of voice or the like of which the intensity is different from that of noise is included, and therefore, peaks in voice can be prevented from being smoothed, and excellent effects are gained, such that it is possible to increase the recognition ratio of voice.

The above and further objects and features of the invention will more fully be apparent from the following detailed description with accompanying drawings.

DETAILED DESCRIPTION OF THE INVENTION

Figure 1:
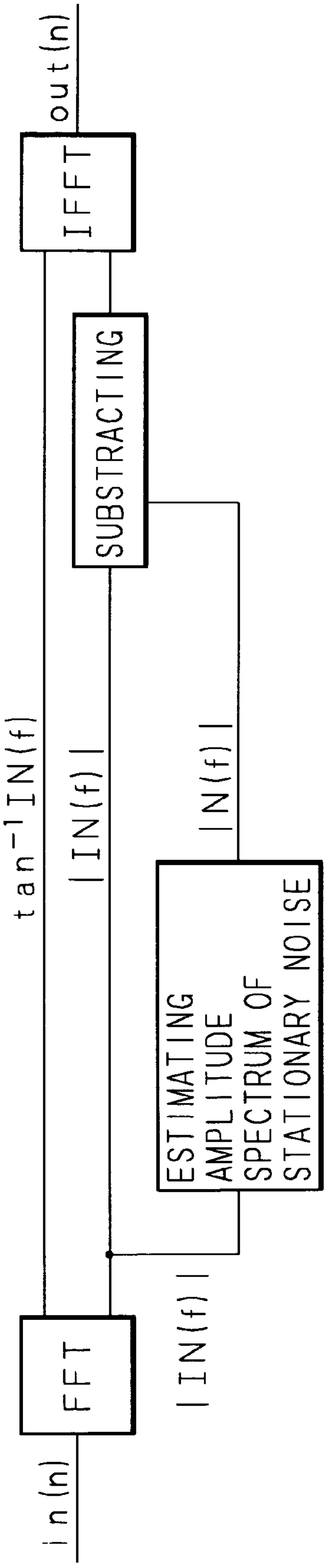
FIG. 1 PRIOR ART
FIG. 1 is a diagram conceptually showing conventional noise suppressing technology.
Figure 2A:
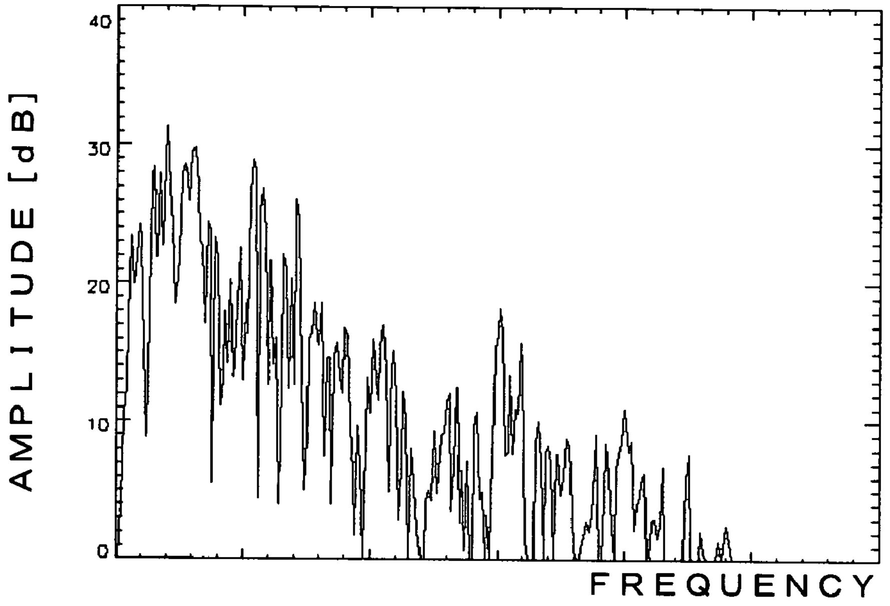
FIGS. 2A and 2B are diagrams showing an amplitude spectrum in accordance with conventional noise suppressing technology.
Figure 2B:
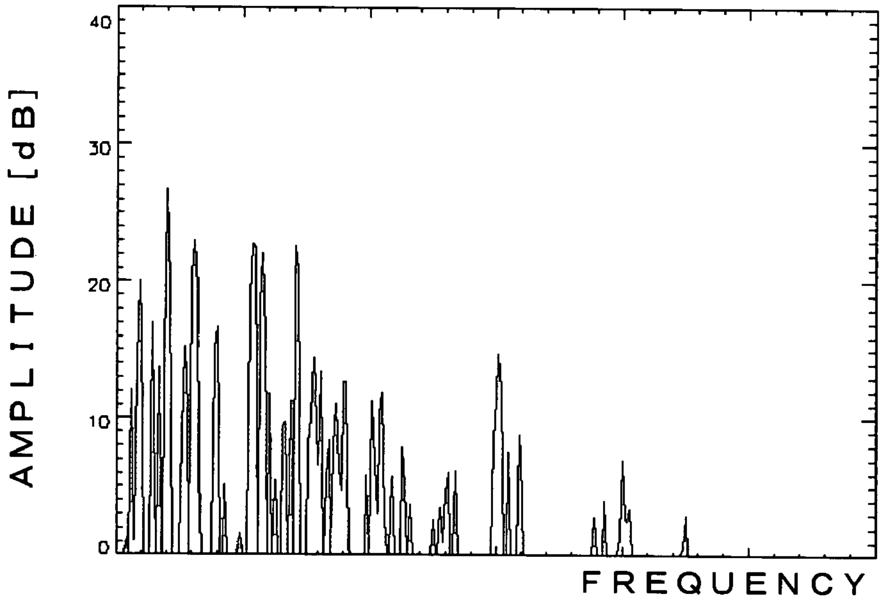
Figure 3:
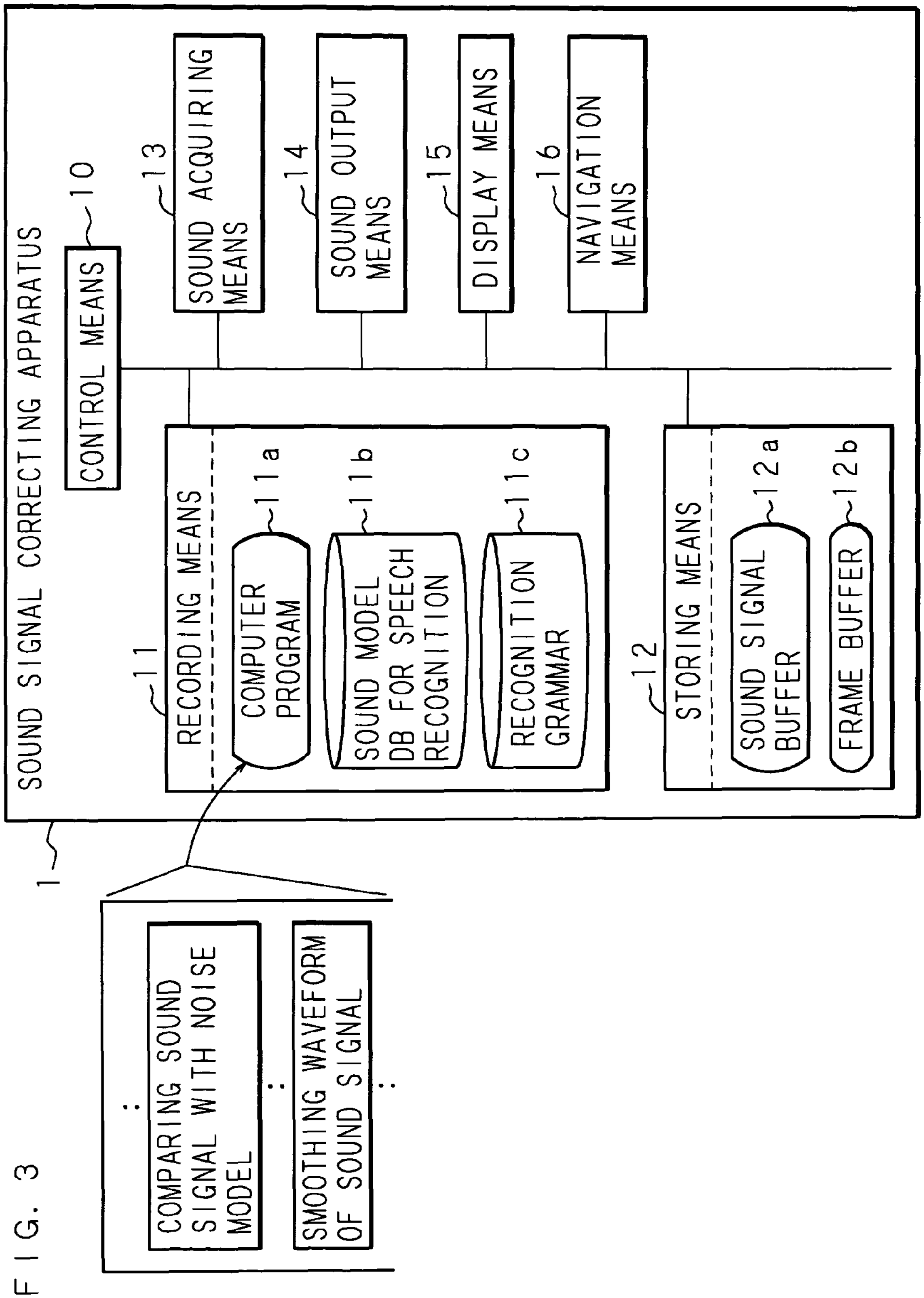
FIG. 3 is a block diagram showing the configuration of a sound signal correcting apparatus according to the present invention.

In the following, the present invention is described in detail in reference to the drawings showing the embodiments thereof. FIG. 3 is a block diagram showing the configuration of a sound signal correcting apparatus according to the present invention. A sound signal correcting apparatus using a computer, such as a navigation device installed in vehicles, for example, is denoted as 1 in FIG. 3, and the sound signal correcting apparatus 1 comprises control means 10 (controller) such as a CPU (central processing unit) or a DSP (digital signal processor) for controlling the entirety of the apparatus, recording means 11 such as a hard disk or a ROM for recording a variety of information, such as programs and data, storing means 12 such as a RAM for storing temporarily created data, sound acquiring means 13 such as a microphone for acquiring sound from the outside, sound output means 14 such as a speaker for outputting sound, display means 15 such as a liquid crystal monitor, and navigation means 16 for executing processes relating to navigation, such as indication of a route to a destination.

The recording means 11 records a computer program 11*a* of the present invention, and a variety of processing steps included in the recorded computer program 11*a* are stored in the storing means 12 and executed under control of the control means 10, and thereby, the computer operates as the sound signal correcting apparatus 1 of the present invention.

In addition, a part of the recording region in the recording means 11 is used as a variety of databases, such as a sound model database for speech recognition (sound model DB for speech recognition) 11*b* for recording sound models and noise models relating to signal patterns for matching which are required for speech recognition, and a recognition grammar 11*c* for recording vocabulary for recognition, which is represented on the basis of the phonemic or syllabic definitions corresponding to the sound models, and grammar.

A part of the storage region of the storing means 12 is used as a sound signal buffer 12*a* for storing digitalized sound signal obtained by sampling sound which is an analog signal acquired by the sound acquiring means 13 at a predetermined period, and as a frame buffer 12*b* for storing frames obtained by dividing a sound signal into pieces of a predetermined time length.

The navigation means 16 has a position detecting mechanism, such as a GPS (Global Positioning System), and a recording medium, such as a DVD (Digital Versatile Disc) or a hard disc, which records map information. The navigation means 16 executes navigation processes, such as searching for a route from the present position to a destination and indicating the route, displays the map and the route on the display means 15, and outputs voice guidance from the sound outputting means 14.

Here, the configuration shown in FIG. 3 is merely an example, and it is possible to develop the present invention in a variety of forms. It is possible to construct a function relating to speech recognition as one or a plurality of VLSI chips, which is thus integrated with the navigation device, and it is also possible to externally attach a dedicated device for speech recognition to the navigation device, for example. In addition, the control means 10 may be used in both of the process for speech recognition and the navigation process, or dedicated circuits may be respectively provided. Furthermore, a co-processor for executing a process including a specific calculation relating to speech recognition, such as FFT (Fast Fourier Transformation) may be incorporated in the control means 10. In addition, the sound signal buffer 12*a* may be provided as a circuit belonging to the sound acquiring means 13, and the frame buffer 12*b* may be formed in a memory provided in the control means 10. Furthermore, it is possible for the sound signal correcting apparatus 1 of the present invention to be used for a variety of applications in devices, such as voice sending devices for telephone communications which suppress noise when voice is sent, relay devices and voice receiving devices, in addition to devices installed in vehicles, such as navigation devices.

Figure 4:
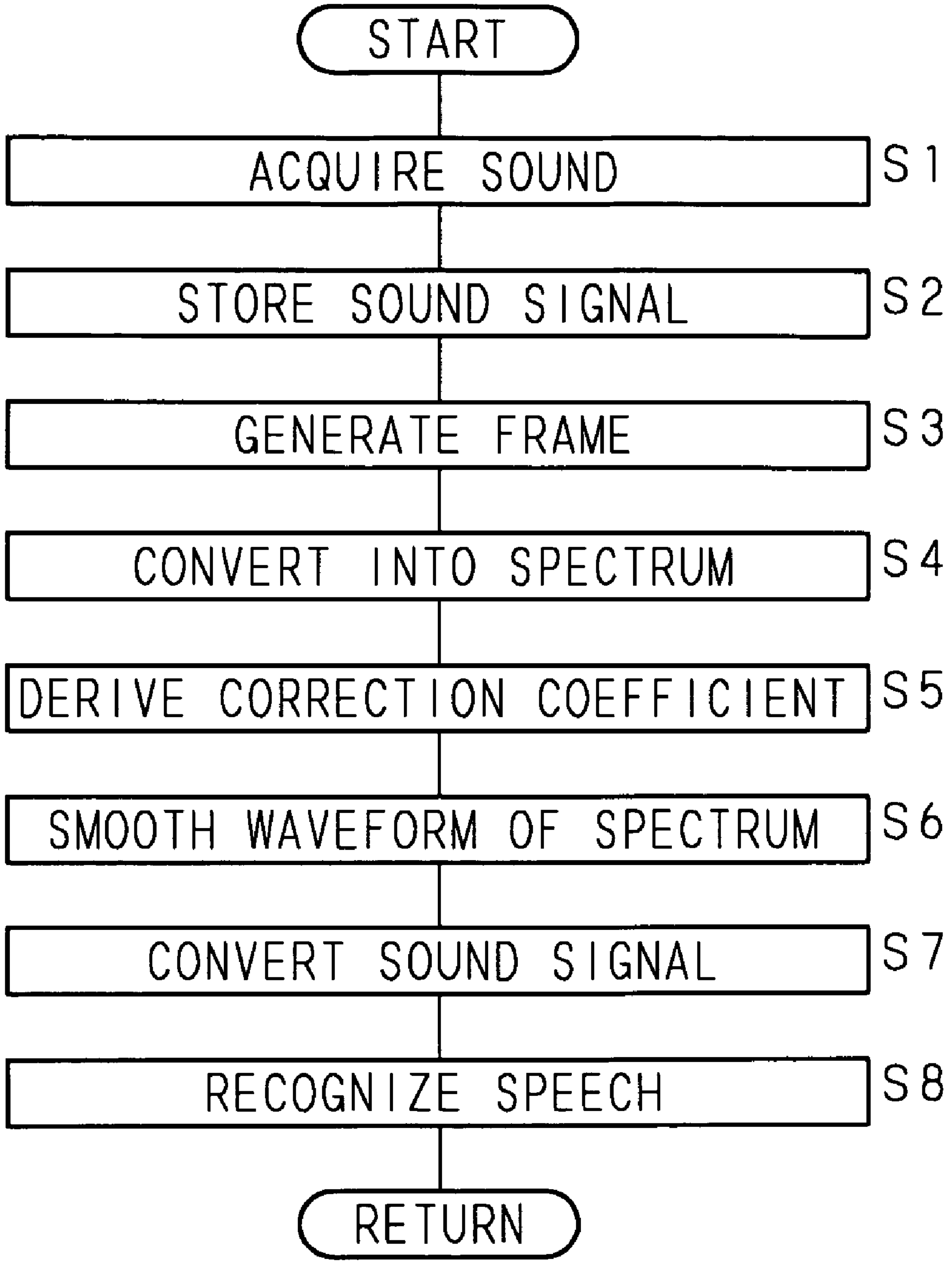
FIG. 4 is a flow chart showing the process in a sound signal correcting apparatus according to the present invention.

Next, the process in the sound signal correcting apparatus 1 of the present invention is described. FIG. 4 is a flow chart showing the process in the sound signal correcting apparatus 1 of the present invention. Under the control of the control means 10 for executing the computer program 11*a*, the sound signal correcting apparatus 1 acquires external sound by means of the sound acquiring means 13 (Step S1), and samples the sound that has been acquired as an analog signal at a predetermined period and stores the thus digitalized sound signal in the sound signal buffer 12*a* (Step S2). The external sound to be acquired in Step S1 is sound where various sounds, such as voice from people, stationary noise and non-stationary noise, overlap. The voice from people is voice to be recognized by matching with a sound model. The stationary noise is noise such as traffic noise and engine noise, which is to be corrected in the present invention by matching with a noise model. The non-stationary noise is noise generated in a non-stationary manner, and a variety of methods for removing non-stationary noise have been proposed and established.

In addition, under the control of the control means 10, the sound signal correcting apparatus 1 generates frames of a predetermined length from the sound signal stored in the sound signal buffer 12*a* (Step S3). In Step S3, the sound signal is divided into frames by a predetermined length of 20 ms to 30 ms, for example. Here, the respective frames overlap each other by 10 ms to 15 ms. For each of the frames, frame process general to the field of speech recognition, including window functions such as a Hamming window and a Hanning window, and filtering with a high pass filter, is performed. The following processes are performed on each of the frames thus generated.

Under the control of the control means 10, the sound signal correcting apparatus 1 converts a sound signal in each frame into a phase spectrum and an amplitude spectrum by performing an FFT process (Step S4), and the amplitude spectrum of the acquired sound signal is compared with a noise model on the basis of an amplitude spectrum of stationary noise or the like, so that a correction coefficient used for correction of the amplitude spectrum of the sound signal is derived (Step S5). In Step S5, the average value of the amplitude spectra of stationary noise, for example, is used as a noise model to be compared. In addition, in Step S5, a comparison of an amplitude spectrum of a sound signal and a noise model is performed by comparing intensity of the amplitude spectrum of the sound signal, for example the peak values, the integrated values of peaks and the squared value of the peaks, with a threshold value determined on the basis of the noise model, and thereby, a correction coefficient in accordance with a difference between the intensity of the amplitude spectrum of the sound signal and the threshold value is derived.

In addition, the sound signal correcting apparatus 1 smoothes the waveform of the amplitude spectrum of the sound signal using the derived correction coefficient (Step S6), and performs an inverse FFT process on the phase spectrum and the smoothed amplitude spectrum, and thereby, converts the sound signal into a sound signal in each frame, where the amplitude spectrum is corrected (Step S7). In Step S6, a change in the amplitude spectrum in the frequency axis direction and/or a change in the time axis direction is smoothed.

Then, under the control of the control means 10, the sound signal correcting apparatus 1 executes a speech recognition process on the output of the sound signal that has been converted in Step S7 (Step S8). In addition, in the case of a speech recognition process using a spectrum of voice, recognition can be achieved from the result of Step S6, without executing Step S7.

Figure 5:
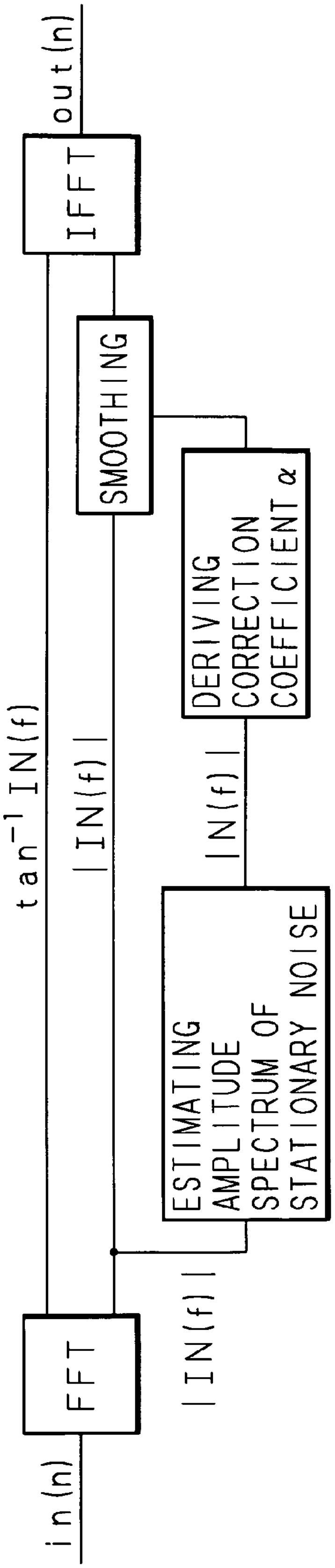
FIG. 5 is a diagram conceptually showing the correcting process in a sound signal correcting apparatus according to the present invention.

The processes in Steps S4 to S7 in the sound signal correcting apparatus 1 of the present invention, which are described in reference to FIG. 4, are described in further detail in the following. FIG. 5 is a diagram conceptually illustrating the correcting process in the sound signal correcting apparatus 1 of the present invention. Here, in FIG. 5, n indicates the frame number of a sound signal on which an FFT process has been performed, and f indicates the frequency. In the sound signal correcting apparatus 1 of the present invention, a sound signal in each frame including sound such as acquired noise and voice is used as an input signal in(n) and converted into a phase spectrum $\tan^{-1}$ IN(f) and an amplitude spectrum |IN(f)| by an FFT process. Then, the amplitude spectrum |N(f)| of stationary noise is estimated on the basis of a noise model having high similarity to the amplitude spectrum |IN(f)| of the sound signal, and a correction coefficient α is derived on the basis of the result of comparison of the estimated amplitude spectrum |N(f)| of stationary noise with the amplitude spectrum |IN(f)| of the sound signal. Then, the waveform of the amplitude spectrum |IN(f)| of the sound signal is smoothed using the derived correction coefficient α. Then, an inverse FFT (IFFT) process is performed on the amplitude spectrum |IN(f)'| that has been smoothed using the correction coefficient α and the phase spectrum $\tan^{-1}$ IN(f), thereby converting into an output signal out(n) in each frame.

Figure 6A:
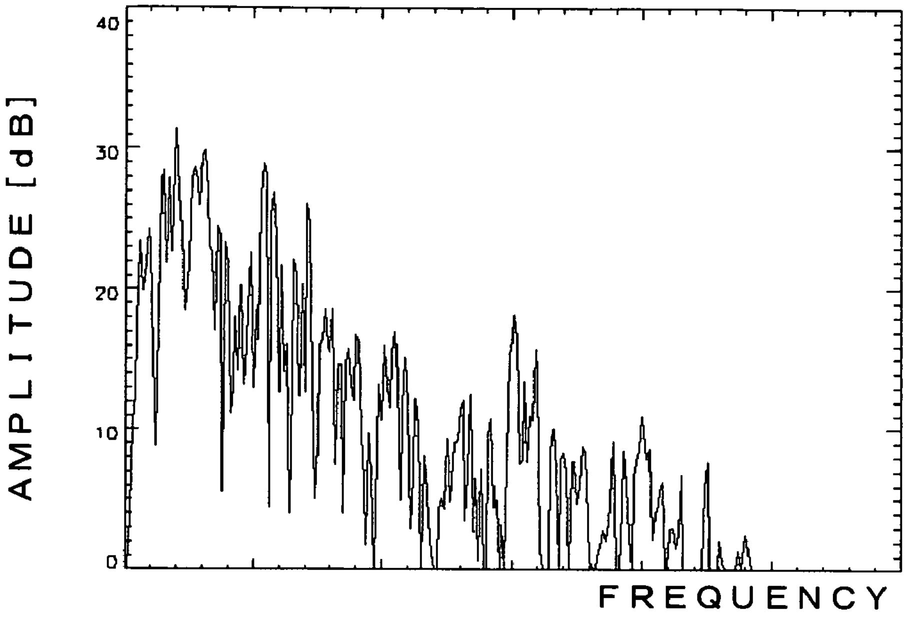
FIGS. 6A and 6B are diagrams showing an amplitude spectrum of a sound signal relating to a sound signal correcting apparatus according to the present invention.
Figure 6B:
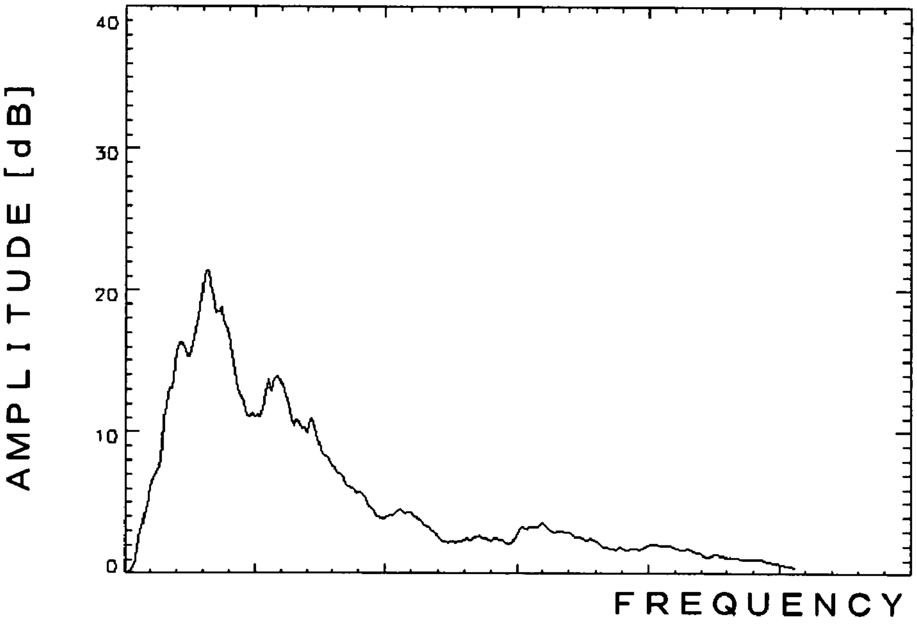

FIGS. 6A and 6B are diagrams showing amplitude spectra of a sound signal relating to the sound signal correcting apparatus 1 of the present invention. FIG. 6A shows the relationship between the values of the frequency and the amplitude of the amplitude spectrum |IN(f)|, and FIG. 6B shows the relationship between the values of the frequency and the amplitude of the amplitude spectrum |IN(f)| of which the waveform has been smoothed. FIGS. 6A and 6B show the waveforms of a sound signal made up of only noise, and the waveform of the amplitude spectrum is corrected to typical waveform for stationary noise where highly non-stationary noise components are suppressed, that is to say, waveform having a high level of similarity to the noise model, by smoothing the amplitude spectrum shown in FIG. 6A to that shown in FIG. 6B. Accordingly, it is easy to remove stationary noise in the processes after speech recognition and the like, and thus, the recognition ratio of voice can be increased.

Figure 7:
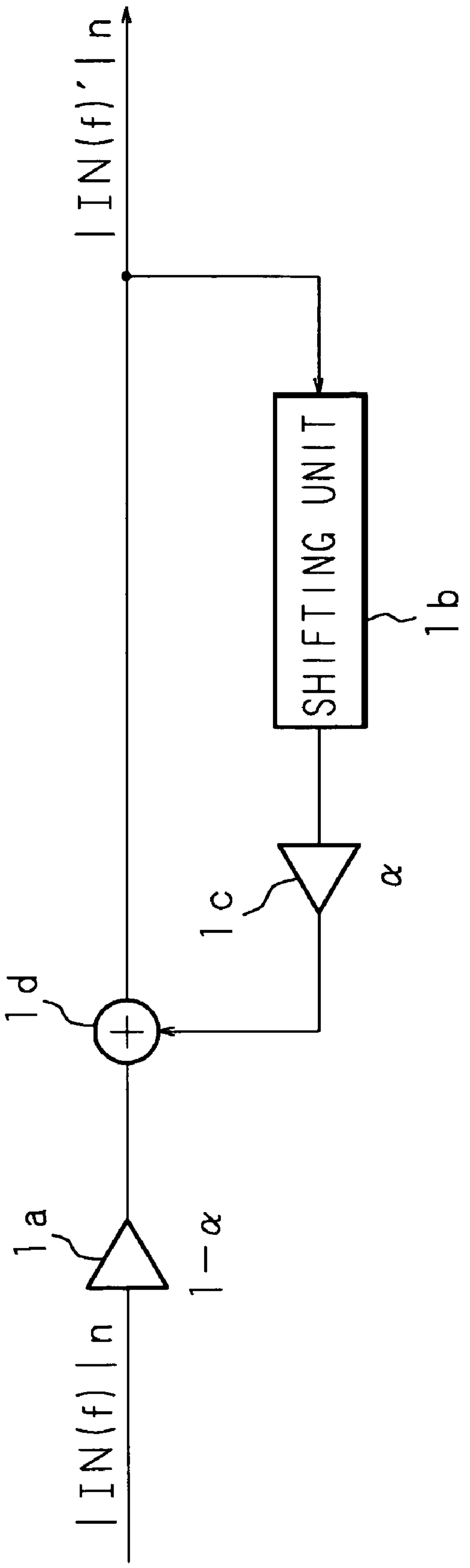
FIG. 7 is a control flow diagram schematically showing the smoothing process in a sound signal correcting apparatus according to the present invention.

FIG. 7 is a control flow diagram schematically showing the smoothing process in the sound signal correcting apparatus 1 of the present invention. FIG. 7 shows the process for smoothing the amplitude spectrum |IN(f)| of a sound signal in the frequency axis direction, which is equivalent to a recursive filter, which is represented by the following formula 1.

$$|IN(f)'|n=\alpha|IN(f-1)'|n+(1-\alpha)|IN(f)|n \qquad \text{formula 1}$$

Here, |IN(f)'|n is an amplitude spectrum at frequency f in the nth frame after smoothing,

|IN(f)|n is an amplitude spectrum at frequency f in the nth frame before smoothing,

|IN(f−1)'|n is an amplitude spectrum in the nth frame at frequency f−1 which is different from the frequency f at a predetermined frequency interval, after smoothing, and α is a correction coefficient where 0≦α≦1.

In formula 1, f−1 is a frequency which is different from the frequency f at a predetermined frequency interval, that is to say, the frequency adjacent to the frequency f in the amplitude spectrum whose frequency is converted into the frequency that is discrete values, and the predetermined frequency interval, which is a difference between the frequency f and the frequency f−1, indicates frequency intervals which are the discrete values. As shown in FIG. 7 and formula 1, in the sound signal correcting apparatus 1 of the present invention, smoothing in the frequency axis direction is executed by repeating a process for adding the spectrum (1−α) |IN(f)|n obtained by multiplying the amplitude spectrum |IN(f)|n of the sound signal by 1−α in an amplifier 1*a* to the spectrum a |IN(f−1)'|n obtained by shifting the amplitude spectrum |IN (f−1)|n at adjacent frequency f−1 after smoothing by a predetermined frequency interval in a shifting unit 1*b*, and then multiplying the result by a in an amplifier 1*c*, in an adder 1*d*.

As is clear from FIG. 7 and formula 1, as the correction coefficient α becomes close to 0, the waveform of the amplitude spectrum after smoothing |IN(f)'|n becomes close to that of the amplitude spectrum before smoothing |IN(f)|n, and in the case where the correction coefficient α is 0, the amplitude spectrum after smoothing |IN(f)'|n coincides with the amplitude spectrum before smoothing |IN(f)|n. In addition, as the correction coefficient α becomes close to 1, the amplitude spectrum after smoothing |IN(f)'|n is smoothed, and in the case where the correction coefficient α is 1, the amplitude spectrum after smoothing |IN(f)'|n is a constant value, where there is no change in the frequency axis direction.

Figure 8:
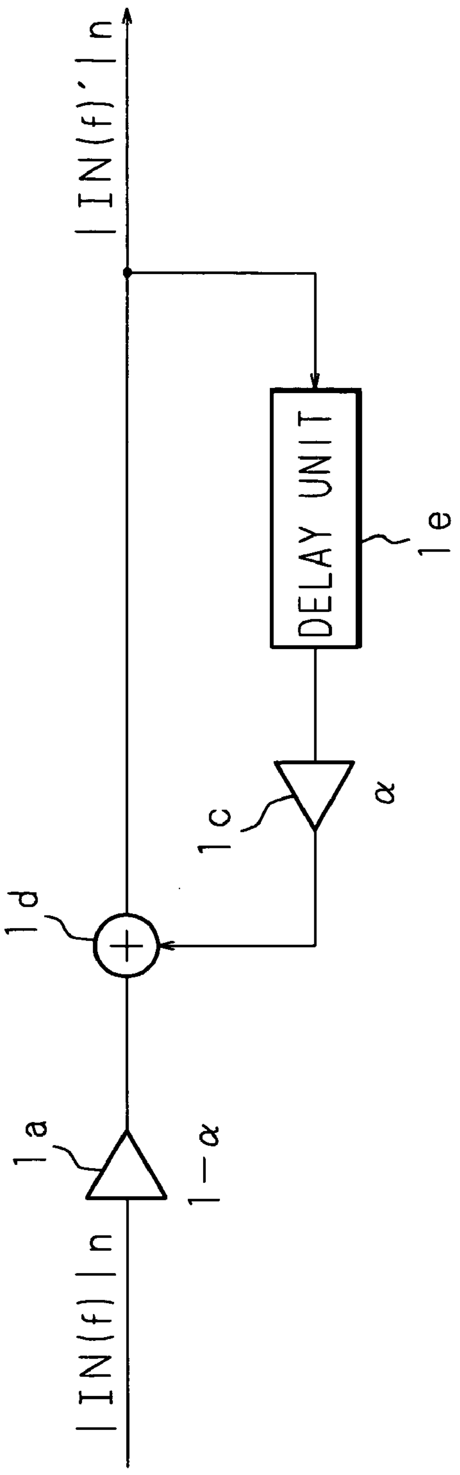
FIG. 8 is a control flow diagram schematically showing the smoothing process in a sound signal correcting apparatus according to the present invention.

FIG. 8 is a control flow diagram schematically showing the smoothing process in the sound signal correcting apparatus 1 of the present invention. FIG. 8 shows the process for smoothing the amplitude spectrum |IN(f)| of a sound signal in the frequency axis direction, and is equivalent to the recursive filter, which is represented by the following formula 2.

$$|IN(f)'|n=\alpha|IN(f)'|n-1+(1-\alpha)|IN(f)|n \qquad \text{formula 2}$$

Here, |IN(f)'|n is an amplitude spectrum at frequency f in the nth frame after smoothing,

|IN(f)|n is an amplitude spectrum at frequency f in the nth frame before smoothing,

|IN(f)'|n−1 is an amplitude spectrum at frequency f in the (n−1)th frame after smoothing, and α is a correction coefficient where 0≦α≦1.

As shown in FIG. 8 and formula 2, the sound signal correcting apparatus 1 of the present invention executes smoothing in the time axis direction by repeating the process for adding the spectrum (1−α)|IN(f)|n obtained by multiplying the amplitude spectrum |IN(f)|n in the nth frame of a sound signal by 1−α in the amplifier 1*a* to the spectrum a |IN(f)'|n−1 obtained by holding the amplitude spectrum |IN(f)'|n−1 in the (n−1)th frame after smoothing, which is the frame directly before the nth frame, for a predetermined time which corresponds to the frame interval in a delay unit 1*e*, and multiplying the result by a in the amplifier 1*c*, in the adder 1*d*.

As is clear from FIG. 8 and formula 2, as the correction coefficient α becomes close to 0, the waveform of the amplitude spectrum after smoothing |IN(f)'|n becomes close to that of the amplitude spectrum before smoothing |IN(f)|n, and in the case where the correction coefficient α is 0, the amplitude spectrum after smoothing |IN(f)'|n coincides with the amplitude spectrum before smoothing |IN(f)|n. In addition, as the correction coefficient α becomes close to 1, the amplitude spectrum after smoothing |IN(f)'|n is smoothed, and in the case where the correction coefficient α is 1, the amplitude spectrum after smoothing |IN(f)'|n is a constant value, where there is no change in the time axis direction.

Here, the frames are generated on the basis of the sound signal which has been divided into pieces of predetermined time intervals, and therefore, formula 2 is equal to a recursive filter, which is represented by the following formula 3.

$$|IN(f)'|t = \alpha |IN(f)'|t-1 + (1-\alpha)|IN(f)|t \quad \text{formula 3}$$

Here, |IN(f)'|t is an amplitude spectrum at frequency f at time t after smoothing,

|IN(f)|t is an amplitude spectrum at frequency f at time t before smoothing,

|IN(f)'|t−1 is an amplitude spectrum at frequency f at time t−1 which is before time t by a predetermined time, after smoothing, and α is a correction coefficient where 0≦α≦1.

Figure 9:
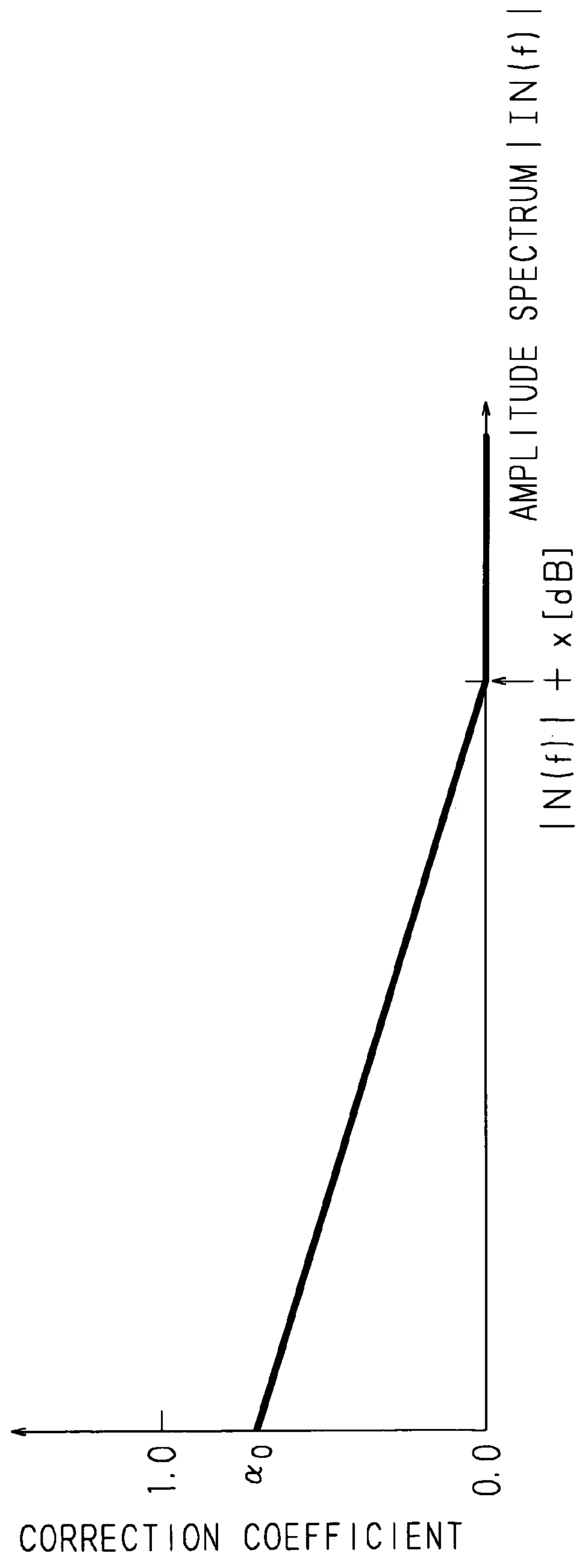
FIG. 9 is a graph showing the correction coefficient deriving process in a sound signal correcting apparatus according to the present invention.

FIG. 9 is a graph showing the correction coefficient deriving process in the sound signal correcting apparatus 1 of the present invention. FIG. 9 shows the relationship between the value of the amplitude spectrum |IN(f)| at the frequency f, which is taken along the horizontal axis, and the correction coefficient α, which is taken along the vertical axis. In addition, the value obtained by adding a constant x [dB] to the value of the stationary noise |N(f)| at the frequency f is used as a threshold value for deriving the correction coefficient α. As shown in FIG. 7, the correction coefficient α is derived in accordance with the difference between the amplitude spectrum |IN(f)| and the threshold value |N(f)|+x [dB], which is determined on the basis of stationary noise relating to the noise model. Concretely, in the case where the value of the amplitude spectrum |IN(f)| is no less than the threshold value |N(f)|+x [dB], the correction coefficient α is 0, and in the case where the value of the amplitude spectrum |IN(f)| is less than the threshold value |N(f)|+x [dB], as the difference between the value of the amplitude spectrum |IN(f)| and the threshold value |N(f)|+x [dB] becomes greater, the correction coefficient α becomes greater, that is to say, as the value of the amplitude spectrum |IN(f)| becomes smaller, the correction coefficient α becomes closer to 1, which is the maximum value. Here, FIG. 9 shows an example of a setting where the maximum value of the correction coefficient α becomes $\alpha_0$.

Instead of using the value of stationary noise |N(f)| as a threshold value, the value obtained by adding a constant x [dB] to the value of stationary noise |N(f)| is used as a threshold value, as shown in FIG. 9, and thereby, it becomes possible to deal with fluctuation in the spectrum of stationary noise.

As described above, in the case where an amplitude spectrum of voice of which the intensity is different from that of stationary noise is included, the degree of smoothing is lowered by making the correction coefficient α small, and therefore, it is possible to prevent peaks on the basis of the voice from being smoothed. In addition, in the case where many components of the amplitude spectrum on the basis of stationary noise are included, the degree of smoothing is increased by making the correction coefficient α great, and thereby, the degree of similarity of the stationary noise to the noise model is increased, and therefore it is possible to remove stationary noise easily.

Though the above described embodiment is shown as an embodiment where a sound signal is converted into a phase spectrum and an amplitude spectrum by an FFT process and the amplitude spectrum of the obtained sound signal is smoothed, the present invention is not limited to this, and it is possible to apply the present invention to a variety of processes, for example one where the complex number resulting from the FFT process is divided into a real part and an imaginary part, so that the real part and the imaginary part are respectively smoothed.

In addition, though the above described embodiment is shown as an embodiment which is applied in a speech recognition apparatus, the present invention is not limited to this, and it is possible to develop the present invention in a variety of forms, for example where the invention is applied to a voice sending device for telephone communications, so that stationary noise included in a sound signal that is sent is suppressed. Here, in the case of application to telephone communications, smoothing is executed only in a voice sending device, but a process for suppressing stationary noise may be executed on the voice receiving device side.

Furthermore, though the above described embodiment is shown as an embodiment where the invention is applied in a process for recognizing speech, it is possible to develop the present invention in a variety of embodiments, for example one where the invention is applied to a learning process in a noise model for speech recognition.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A sound signal correcting method, comprising:

comparing the sound signal based on acquired sound with a noise model relating to a noise pattern; and smoothing a waveform of the sound signal, to smooth a change in a spectrum of the sound signal in a time axis direction, on the basis of the comparison result and a following formula (B):

$$|IN(f)'|t = \alpha |IN(f)'|t-1 + (1-\alpha)|IN(f)|t \quad \text{formula (B)}$$

where |IN(f)'|t is a spectrum at frequency f at time t after smoothing,

|IN(f)|t is a spectrum at frequency f at time t before smoothing,

|IN(f)'|t−1 is a spectrum at frequency f at time t−1 which is before time t by a predetermined time, after smoothing, and α is a correction coefficient where 0≦α≦1.

2. A sound signal correcting controller running a computer program that causes the controller to implement a method said method comprising:

comparing the sound signal based on acquired sound with a noise model relating to a noise pattern; and smoothing a waveform of the sound signal on the basis of the comparison result, wherein the controller smooths a change in a spectrum of the sound signal in a time axis direction, and smooths on the basis of a following formula (B):

$$|IN(f)'|t = \alpha |IN(f)'|t-1 + (1-\alpha)|IN(f)|t \quad \text{formula (B)}$$

where |IN(f)'|t is a spectrum at frequency f at time t after smoothing,

|IN(f)|t is a spectrum at frequency f at time t before smoothing,

|IN(f)'|t−1 is a spectrum at frequency f at time t−1 which is before time t by a predetermined time, after smoothing, and α is a correction coefficient where 0≦α≦1.

3. A sound signal correcting controller running a computer program that causes the controller to implement a method, said method comprising:

deriving a correction coefficient used to correct the sound signal based on acquired sound by comparing a spectrum of the sound signal with a noise model relating to a noise pattern; and smoothing a waveform of the sound signal using the derived correction coefficient, wherein the controller smooths a change in the spectrum of the sound signal in a time axis direction, and smooths on the basis of a following formula (B):

$$|IN(f)'|t=\alpha|IN(f)'|t-1+(1-\alpha)|IN(f)|t \quad \text{formula (B)}$$

where |IN(f)'|t is a spectrum at frequency f at time t after smoothing,

|IN(f)|t is a spectrum at frequency f at time t before smoothing,

|IN(f)'|t−1 is a spectrum at frequency f at time t−1 which is before time t by a predetermined time, after smoothing, and α is a correction coefficient where 0≦α≦1.

4. A non-transitory computer readable recording medium recording a computer program to cause a computer to implement a method, wherein said method comprises:

comparing a sound signal based on acquired sound with a noise model relating to a noise pattern; and smoothing a waveform of the sound signal, to smooth a change in a spectrum of the sound signal in a time axis direction, on the basis of the comparison result and a following formula (B):

$$|IN(f)'|t=.alpha.|IN(f)'|t-1+(1-.alpha.)|IN(f)|t \quad \text{formula (B)}$$

where |IN(f)'|t is a spectrum at frequency f at time t after smoothing,

|IN(f)|t is a spectrum at frequency f at time t before smoothing,

|IN(f)'|t−1 is a spectrum at frequency f at time t−1 which is before time t by a predetermined time, after smoothing, and .alpha. is a correction coefficient where 0<=.alpha.<=1.

5. A sound signal correcting method, comprising: comparing the sound signal based on acquired sound with a noise model relating to a noise pattern; and smoothing a waveform of the sound signal, to smooth a change in a spectrum of the sound signal in a frequency axis direction, on the basis of the comparison result and a following formula (A):

$$|IN(f)'|=\alpha|IN(f-1)'|+(1-\alpha)|IN(f)| \quad \text{formula (A)}$$

where |IN(f)'| is a spectrum at frequency f after smoothing,

|IN(f)| is a spectrum at frequency f before smoothing,

|IN(f−1)'| is a spectrum at frequency f−1 which is different from the frequency f at a predetermined frequency interval, after smoothing, and α is a correction coefficient where 0≦α≦1.

6. A sound signal correcting controller running a computer program that causes the controller to implement a method said method comprising:

comparing the sound signal based on acquired sound with a noise model relating to a noise pattern; and smoothing a waveform of the sound signal on the basis of the comparison result, wherein the controller smooths a change in a spectrum of the sound signal in a frequency axis direction, and smooths on the basis of a following formula (A):

$$|IN(f)'|=\alpha|IN(f-1)'|+(1-\alpha)|IN(f)| \quad \text{formula (A)}$$

where |IN(f)'| is a spectrum at frequency f after smoothing,

|IN(f)| is a spectrum at frequency f before smoothing,

|IN(f−1)'| is a spectrum at frequency f−1 which is different from the frequency f at a predetermined frequency interval, after smoothing, and α is a correction coefficient where 0≦α≦1.

7. The sound signal correcting controller according to claim 6, wherein said controller executes a speech recognition process on the basis of the sound signal after smoothing.

8. A sound signal correcting controller running a computer program that causes the controller to implement a method, said method comprising:

deriving a correction coefficient used to correct the sound signal based on acquired sound by comparing a spectrum of the sound signal with a noise model relating to a noise pattern; and smoothing a waveform of the sound signal using the derived correction coefficient wherein the controller smooths change in the spectrum of the sound signal in a frequency axis direction, and smooths on the basis of a following formula (A):

$$|IN(f)'|=\alpha|IN(f-1)'|+(1-\alpha)|IN(f)| \quad \text{formula (A)}$$

where |IN(f)'| is a spectrum at frequency f after smoothing,

|IN(f)| is a spectrum at frequency f before smoothing,

|IN(f−1)'| is a spectrum at frequency f−1 which is different from the frequency f at a predetermined frequency interval, after smoothing, and α is a correction coefficient where 0≦α≦1.

9. The sound signal correcting controller according to claim 8, wherein said controller derives the correction coefficient in accordance with a difference between intensity of the spectrum of the sound signal and a threshold value determined on the basis of the noise model.

10. The sound signal correcting controller according to claim 8, wherein said controller executes a speech recognition process on the basis of the sound signal after smoothing.

11. A non-transitory computer readable recording medium recording a computer program to cause a computer to implement a method, wherein said method comprises:

comparing sound signal based on acquired sound with a noise model relating to a noise pattern; and smoothing a waveform of the sound signal, to smooth a change in a spectrum of the sound signal in a frequency axis direction, on the basis of the comparison result and a following formula (A):

$$|IN(f)'|=.alpha.|IN(f-1)'|+(1-.alpha.)|IN(f)| \quad \text{formula (A)}$$

where |IN(f)'| is a spectrum at frequency f after smoothing,

|IN(f)| is a spectrum at frequency f before smoothing,

|IN(f−1)'| is a spectrum at frequency f−1 which is different from the frequency f at a predetermined frequency interval, after smoothing, and .alpha. is a correction coefficient where 0<=.alpha.<=1.

* * * * *